(12) United States Patent
Maeda et al.

(10) Patent No.: US 10,191,361 B2
(45) Date of Patent: Jan. 29, 2019

(54) LIGHT SOURCE DEVICE INCLUDING A LIGHT SOURCE SECTION TO ADJUST BRIGHTNESS AND PROJECTOR USING THE SAME

(71) Applicants: Ikuo Maeda, Kanagawa (JP); Kazuhiro Fujita, Tokyo (JP); Toshiharu Murai, Kanagawa (JP); Tatsuya Takahashi, Tokyo (JP); Takehiro Nishimori, Kanagawa (JP)

(72) Inventors: Ikuo Maeda, Kanagawa (JP); Kazuhiro Fujita, Tokyo (JP); Toshiharu Murai, Kanagawa (JP); Tatsuya Takahashi, Tokyo (JP); Takehiro Nishimori, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/638,161

(22) Filed: Jun. 29, 2017

(65) Prior Publication Data

US 2017/0299953 A1    Oct. 19, 2017

Related U.S. Application Data

(63) Continuation of application No. 14/648,823, filed as application No. PCT/JP2013/085309 on Dec. 24, 2013, now Pat. No. 9,726,966.

(30) Foreign Application Priority Data

Dec. 26, 2012  (JP) ................................. 2012-282475
Sep. 4, 2013   (JP) ................................. 2013-182894

(51) Int. Cl.
*G03B 21/20*    (2006.01)
*H04N 9/31*    (2006.01)
(Continued)

(52) U.S. Cl.
CPC .............. *G03B 21/204* (2013.01); *F21K 9/64* (2016.08); *F21V 9/30* (2018.02); *G02B 26/008* (2013.01);
(Continued)

(58) Field of Classification Search
CPC ........... F21K 9/64; F21V 9/16; G02B 26/008; G02B 27/102; G03B 21/2013;
(Continued)

(56) References Cited

U.S. PATENT DOCUMENTS 8,194,192 B2    6/2012  Harada et al.
2010/0283977 A1  11/2010  Wang et al.
(Continued)

FOREIGN PATENT DOCUMENTS

CN    101937161 A    1/2011
CN    102155639 A    8/2011
(Continued)

OTHER PUBLICATIONS

International Search Report dated Nov. 3, 2014 in PCT/JP2013/085309 filed on Dec. 24, 2013.
(Continued)

*Primary Examiner* — Sultan Chowdhury
*Assistant Examiner* — Magda Cruz
(74) *Attorney, Agent, or Firm* — Oblon, McClelland, Maier & Neustadt, L.L.P.

(57) ABSTRACT

A light source device comprising: a light source section which generates any one of blue light, red light, and green light; a phosphor which generates a fluorescence including the two colors other than the color of the light emitted from the light source section; a color-changing section which changes one of the two colors of the fluorescence emitted from the phosphor to another color regularly and irradiates it to the image-forming element; and a light path-switching
(Continued)

section which switches a light path in which a fluorescence excited by the color light emitted from the light source section passes towards the color-changing section and a light path in which the color light emitted from the light source section passes towards the image-forming element regularly.

2 Claims, 14 Drawing Sheets

(51) Int. Cl.
G03B 33/08 (2006.01)
G02B 26/00 (2006.01)
G02B 27/10 (2006.01)
F21K 9/64 (2016.01)
H04N 9/77 (2006.01)
F21V 9/30 (2018.01)

(52) U.S. Cl.
CPC ....... G02B 27/102 (2013.01); G03B 21/2013 (2013.01); G03B 21/2066 (2013.01); G03B 33/08 (2013.01); H04N 9/3114 (2013.01); H04N 9/3158 (2013.01); H04N 9/3161 (2013.01); H04N 9/3182 (2013.01); H04N 9/77 (2013.01)

(58) Field of Classification Search
CPC .. G03B 21/204; G03B 21/2066; G03B 33/08; H04N 9/3114; H04N 9/3158; H04N 9/3161; H04N 9/3182; H04N 9/77
See application file for complete search history.

(56) References Cited

U.S. PATENT DOCUMENTS

| | | | |
|---|---|---|---|
| 2010/0328625 A1* | 12/2010 | Miyazaki | G02B 26/008 353/85 |
| 2010/0328632 A1 | 12/2010 | Kurosaki et al. | |
| 2011/0187998 A1 | 8/2011 | Kimura et al. | |
| 2011/0228232 A1 | 9/2011 | Sakata et al. | |
| 2012/0242912 A1 | 9/2012 | Kitano | |
| 2013/0010264 A1* | 1/2013 | Takahashi et al. | G03B 21/14 353/20 |
| 2013/0021582 A1* | 1/2013 | Fujita | G03B 21/204 353/31 |
| 2013/0114044 A1 | 5/2013 | Inoue et al. | |
| 2013/0114049 A1* | 5/2013 | Li | G03B 21/2013 353/84 |
| 2013/0293848 A1 | 11/2013 | Kimura et al. | |
| 2014/0152964 A1 | 6/2014 | Sakata et al. | |
| 2014/0354892 A1 | 12/2014 | Kitano | |

FOREIGN PATENT DOCUMENTS

| | | |
|---|---|---|
| CN | 102520569 A | 6/2012 |
| CN | 102645825 A | 8/2012 |
| CN | 102720986 A | 10/2012 |
| JP | 2008-145508 A | 6/2008 |
| JP | 2011-13316 A | 1/2011 |
| JP | 4711154 | 4/2011 |
| JP | 2011-128522 | 6/2011 |
| JP | 2011-158502 A | 8/2011 |
| JP | 2012-53162 | 3/2012 |
| JP | 2012-150212 A | 8/2012 |
| JP | 2012-212129 | 11/2012 |
| JP | 2013-76968 | 4/2013 |
| WO | WO 2012/029679 A1 | 3/2012 |
| WO | WO 2013/063902 A1 | 5/2013 |

OTHER PUBLICATIONS

Extended European Search Report dated Jan. 19, 2016 in Patent Application No. 13869826.1.
Combined Office Action and Search Report dated Jan. 25, 2016 in Chinese Patent Application No. 201380068102.0 (with English language translation).
Office Action dated Sep. 20, 2016 in Japanese Patent Application No. 2016-017227.
Office Action dated Feb. 20, 2018 in Japanese Patent Application No. 2017-031622, 3 pages.
Combined Office Action and Search Report dated Feb. 6, 2018 in Chinese Patent Application No. 201610633465.X, with English translation, 13 pages.
Japanese Office Action dated Jul. 31, 2018, issued in Japanese Patent Application No. 2017-031622.

* cited by examiner

LIGHT SOURCE DEVICE INCLUDING A LIGHT SOURCE SECTION TO ADJUST BRIGHTNESS AND PROJECTOR USING THE SAME

CROSS-REFERENCE TO RELATED APPLICATIONS

The present application is a continuation of U.S. patent application Ser. No. 14/648,823, filed on Jun. 1, 2015, which is a national stage application of International Patent Application Number PCT/JP2013/085309, filed on Dec. 24, 2013, and is based on and claims priority from Japanese Patent Application Numbers 2012-282475, filed on Dec. 26, 2012, and 2013-182894 filed Sep. 4, 2013. The entire contents of each of the above applications are hereby incorporated by reference herein in entirety.

TECHNICAL FIELD

The present invention relates to an improvement of a light source device which temporarily irradiates each of blue light, red light, and green light to an image-forming element to form a color image on a screen by the image-forming element, and a projector using the light source device.

BACKGROUND ART

A projector which temporarily irradiates blue light, red light, and green light to an image-forming element in order to form a color image on a screen by the image-forming element is conventionally known (for example, registered Japanese patent No. 4711154).

The projector disclosed in the above JP patent No. 4711154 includes a blue laser diode, a phosphor, and a dichroic mirror as a single light source section. The phosphor is configured of a rotatable disk. The phosphor includes a phosphor area which generates green fluorescence by the irradiation of a blue laser beam as excitation light, a phosphor area which generates red fluorescence by the irradiation of excitation light, and a transmitting area which transmits a blue laser beam. The areas are separated in order to provide each prescribed angle.

Light paths of the blue laser beam, green fluorescence, and red fluorescence are concentrated by the dichroic mirror, and each of the blue laser beam, green fluorescence, and red fluorescence temporarily irradiates the image-forming element. Thereby, a color image is formed on the screen surface.

However, in the conventional projector, it is necessary to form each fluorescence area and transmitting area on the phosphor. Therefore, the manufacturing process of the phosphor is complicated.

In addition, because the angle size of the fluorescence area which is formed on the phosphor and the angle size of the transmitting area may differ according to the type of projector, it is necessary to manufacture the phosphor to be configured of a fluorescence area having a different angle for each type of projector. As such, control of the phosphor is complicated.

SUMMARY OF THE INVENTION

It is, therefore, an object of the present invention to provide a light source device in which a manufacturing process of a phosphor can be simplified, a configuration of an optical system can be simplified, and layout freedom can be improved, and a projector using the light source device. The light source device includes a single light source section and is capable of generating a color image without separating a fluorescence area of the phosphor into an area which emits green fluorescence and an area which emits red fluorescence.

A light source device according to the present invention irradiates blue light, red light, and green light in turn on an image-forming element and forms a color image on a screen by the image-forming element, comprising:

a light source section which generates any one of the blue light, the red light, and the green light;

a phosphor which generates a fluorescence including the two colors other than the color of the light emitted from the light source section through irradiation of the color light emitted from the light source section;

a color-changing section which changes one of the two colors of the fluorescence emitted from the phosphor to another fluorescence color regularly and irradiates it to the image-forming element; and a light path-switching section which is disposed in a light path of the color light emitted from the light source section, and switches a light path of the color light emitted from the light source section between a light path in which a fluorescence excited by the color light emitted from the light source section passes towards the color-changing section and a light path in which the color light emitted from the light source section passes towards the image-forming element regularly.

DESCRIPTION OF EMBODIMENTS

Embodiment 1

Figure 1:
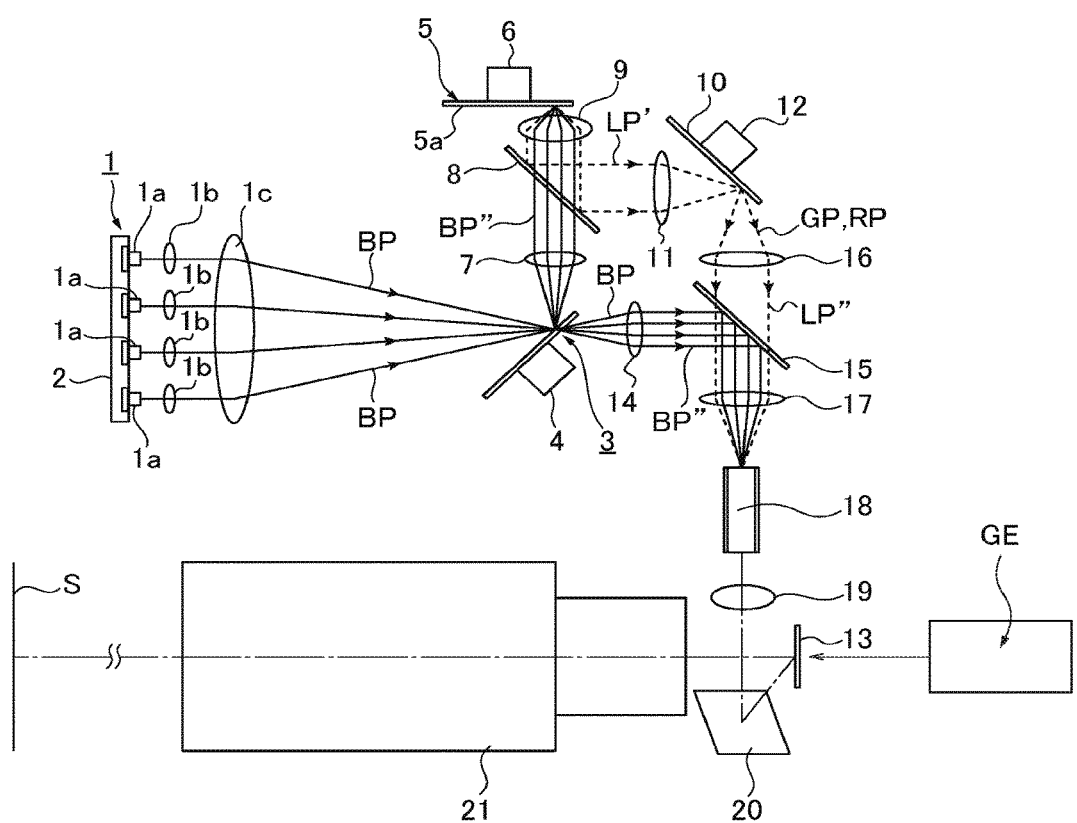
FIG. 1 is an optical view illustrating a main configuration of an optical system of a projector according to Embodiment 1 of the present invention.

FIG. 1 is an optical view illustrating a main configuration of an optical system of a projector which includes a light source device according to Embodiment 1 of the present invention. In FIG. 1, numeral 1 represents a light source section. The light source section 1 is schematically configured of a laser diode (LD) as a laser light source, a coupling lens 1b, and a light-condensing lens 1c.

A plurality of laser diodes 1a is disposed on a driving circuit board 2, and the coupling lens 1b is disposed corresponding to each laser diode 1a. A laser beam emitted from the laser diode 1a is concentrated by the coupling lens 1b to be a parallel light flux and guided to the light-condensing lens 1c.

The light-condensing lens 1c concentrates the laser beam after becoming a parallel light flux through each coupling lens 1c. The laser diode 1a emits a blue (B) laser beam BP as one of blue (B) light, red (R) light, and green (G) light. However, a laser diode which emits a green laser beam and/or red laser beam can be used similarly. Also, a light-emitting diode (LED) can be used instead of the laser diode (LD).

A light path-switching disk 3 as a light path-switching section is disposed in a light path of the blue laser beam BP emitted from the light source section 1. The laser beam BP irradiates the light path-switching disk in a spot form. The size of the spot of the laser beam BP is determined to be an appropriate size capable of avoiding color mixing and so on.

Figure 2:
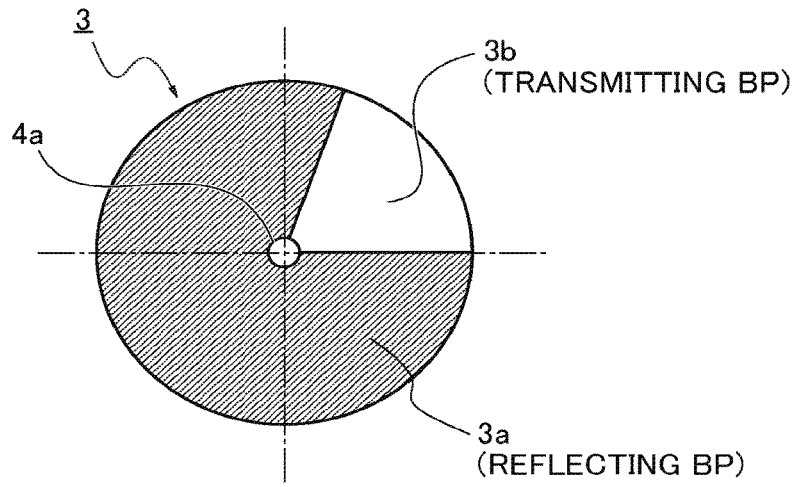
FIG. 2 is a plan view of a light path-switching disk of the projector shown in FIG. 1.

The light path-switching disk 3 is configured of a rotatable disk for switching the light path in turn and includes a reflecting area 3a and a transmitting area 3b divided in a rotational direction, as shown in FIG. 2. The light path-switching disk 3 is disposed at an angle (herein, 45 degrees to the optical axis) to an optical axis of the light-condensing lens 1c.

The light path-switching disk 3 is, for example, as shown in FIG. 1, driven to rotate by a stepping motor 4 of a driving source. In this regard, in FIG. 2, numeral 4a represents a driving axis.

Figure 3:
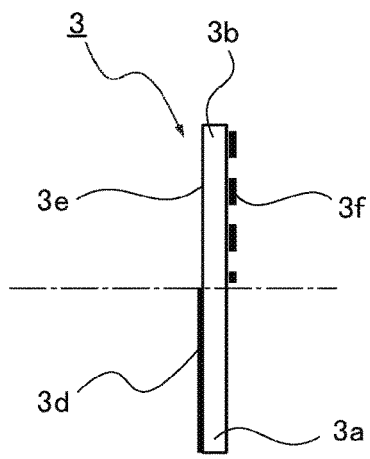
FIG. 3 is a side surface view of the light path-switching disk of the projector shown in FIG. 1.

As shown in FIG. 3, a reflecting coat 3d is formed on the reflecting area 3a of the light path-switching disk 3 on the surface which receives the blue laser beam BP.

A reflecting coat 3e is formed on the transmitting area 3b of the light path-switching disk 3 on the surface which receives the blue laser beam BP. A dispersing coat 3f is formed on the opposite surface to the reflecting coat 3e. The dispersing surface 3f is applied for reducing speckling of the laser beam BP.

Instead of providing the dispersing surface 3f on the light path-switching disk 3, a rotating dispersing plate can be provided.

The light path of the blue laser beam BP which is reflected by the reflecting area 3a is the path in which the blue laser beam BP is emitted from the light source section 1 which irradiates a phosphor 5.

Herein, the phosphor 5 is configured from a rotatable disk. In FIG. 1, numeral 6 represents a stepping motor as a driving source for the phosphor.

A fluorescent coat 5a is applied on the phosphor 5. The fluorescent coat 5a generates green fluorescence and red fluorescence which are different from the blue laser beam BP, by the irradiation of the blue laser beam BP emitted from the light source section 1.

By the rotation of the phosphor 5, the deterioration of the fluorescent coat 5a due to the laser beam irradiating the same spot continuously for a long time can be prevented. For the fluorescent coat 5a, for example, a mixture of a fluorescent material which generates green fluorescence and a fluorescent material which generates red fluorescence by being excited through the irradiation of the blue laser beam is applied. However, it is not limited to the above.

For example, a fluorescent material having a characteristic of a fluorescence range over a wavelength of green and a wavelength of red can be used.

A light-condensing lens 7, a dichroic mirror 8, and a light-condensing lens 9 are disposed in the light path in which the blue laser beam BP is reflected toward the phosphor 5. The light-condensing lens 7 concentrates the blue laser beam BP which is reflected by the reflecting area 3a and converts it into a parallel light flux BP'''.

The dichroic mirror 8 transmits the blue laser beam BP and guides it to the phosphor 5. The dichroic mirror 8 reflects fluorescent light of another color than blue and guides it to a color component-changing disk 10, as a color-changing section.

In Embodiment 1, the color-changing disk 10 switches the green fluorescence GP and the red fluorescence RP. The light-condensing lens 9 concentrates the parallel light flux BP''' on the phosphor 5 in a spot form, concentrates the fluorescence emitted from the phosphor 5, and converts it into a parallel light flux LP'.

In Embodiment 1, a fluorescence YP is excited by light having each color emitted from the light source section 1. A light path in which a fluorescence YP passes towards the color-changing disk 10 through the light-condensing lens 9, the dichroic mirror 8, and the light-condensing lens 11 is formed.

The light-condensing lens 11 is disposed between the dichroic mirror 8 and the color-changing disk 10. The fluorescence which is reflected by the dichroic mirror 8 is concentrated by the light-condensing lens 11 and irradiates to the color-changing disk 10. Herein, the color-changing disk 10 is disposed at an angle to the optical axis of the light-condensing lens 11.

Figure 4:
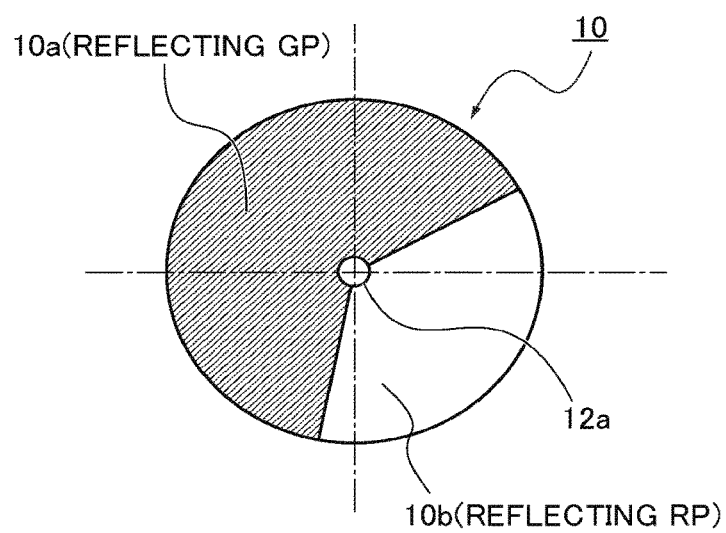
FIG. 4 is a plan view of a color-changing disk of the projector shown in FIG. 1.

As shown in FIG. 4, the color-changing disk 10 is configured of a rotatable disk for changing color in turn. In the disk, a reflecting area 10a and a reflecting area 10b are formed to be divided in the rotating direction. The reflecting area 10a reflects the green fluorescence GP, absorbs the red fluorescence RP, or transmits the red fluorescence RP, and the reflecting area 10b reflects the red fluorescence RP and absorbs the green fluorescence GP or transmits the green fluorescence GP. The color-changing disk 10 is also driven to rotate by the stepping motor 12 as a driving source, for example. In Embodiment 1, the color-changing disk 10 reflects both of green and red fluorescence GP and RP but it is not limited to the above. It can be configured to reflect one of fluorescence GP and fluorescence RP and transmit the other. In FIG. 4, numeral 12a represents the driving axis.

The blue laser beam BP after passing through the transmitting area 3b passes through a light path in which the blue laser beam BP emitted from the light source section 1 irradiates an image-forming panel 13 as a conventional image-forming element (for example, a digital micromirror micro device DMD). That is, the light path is such that light having each color emitted from the light source section 1 passes towards the image-forming element.

A light-condensing lens 14 is disposed in the light path. The light-condensing lens 14 converts the blue laser beam BP which has transmitted through the light path-switching disk 3 into a parallel light flux BP", and guides the parallel light flux BP" to a dichroic mirror 15.

A light-condensing lens 16 is disposed ahead of the passing direction of the green fluorescence GP and the red fluorescence RP which are reflected by the color-changing disk 10. The light-condensing lens 16 concentrates the green fluorescence GP and the red fluorescence RP, converts them into a parallel light flux LP", and guides it to the dichroic mirror 15. Herein, the dichroic mirror is disposed at an angle to the optical axis of the light-condensing lenses 14 and 16.

The dichroic mirror 15 is disposed on the light path between the image-forming panel 13 and the color-changing disk 10. The dichroic mirror 15 concentrates the light path of the parallel light flux BP" as blue light and the light path of the parallel light flux LP" as green (or red) light and guides it to the image-forming panel 13, as a mirror for light-path concentrating.

The parallel light fluxes BP" and LP" whose light paths are concentrated through the dichroic mirror 15 are concentrated by a light-condensing lens 17 and guided to the conventional light tunnel 18. The light tunnel 18 is an optical member for preventing the irregularity of light quantity which lowers the irregularity of light quantity. Herein, a fly-eye lens can be used instead of the light tunnel 18.

The light which passes through the light tunnel 18 becomes a parallel light flux through a light-condensing lens 19. The light is reflected by a reflecting mirror 20 and guided to the image-forming panel 13. The image-forming panel 13 is, for example, controlled by a conventional image generation part GE, for example. The light having each color is reflected by the image-forming panel 13 and irradiates a screen S through a projecting lens 21. Thereby, a color image is enlarged and formed on the screen S.

Figure 5:
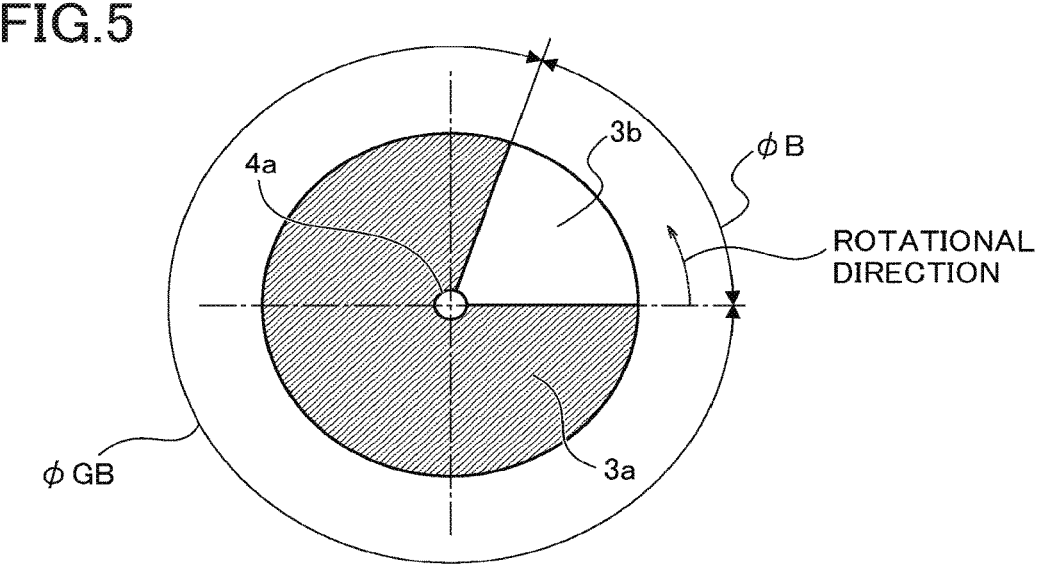
FIG. 5 is an explanatory view illustrating a relationship between an angle of a transmitting area and an angle of a reflecting area of the light path-switching disk shown in FIG. 2.
Figure 6:
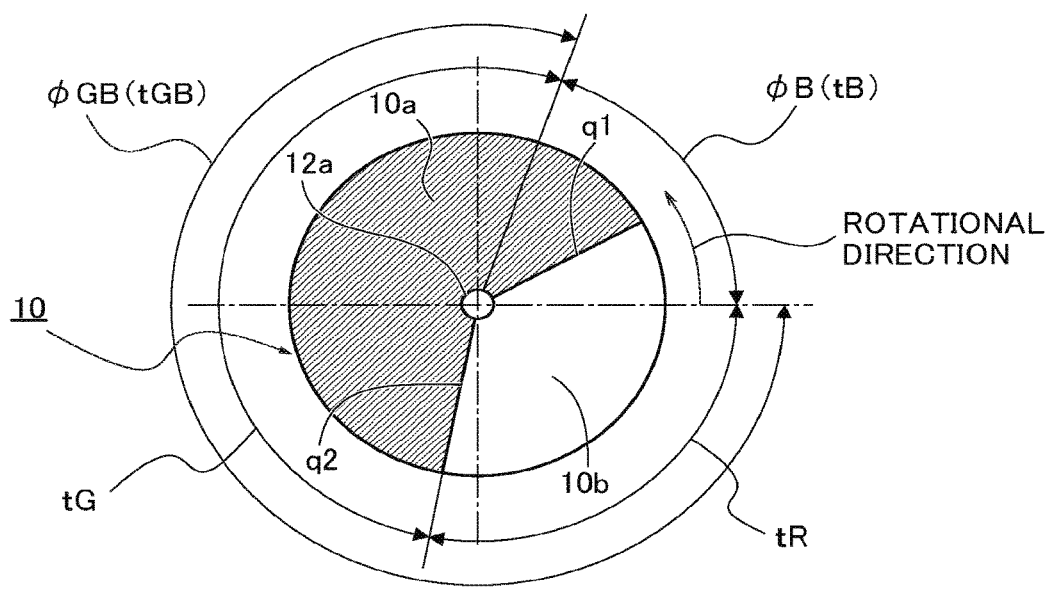
FIG. 6 is an explanatory view illustrating a relationship between an angle of a reflecting area of blue light and an angle of a reflecting area of red light of a color component-changing disk.
Figure 7:
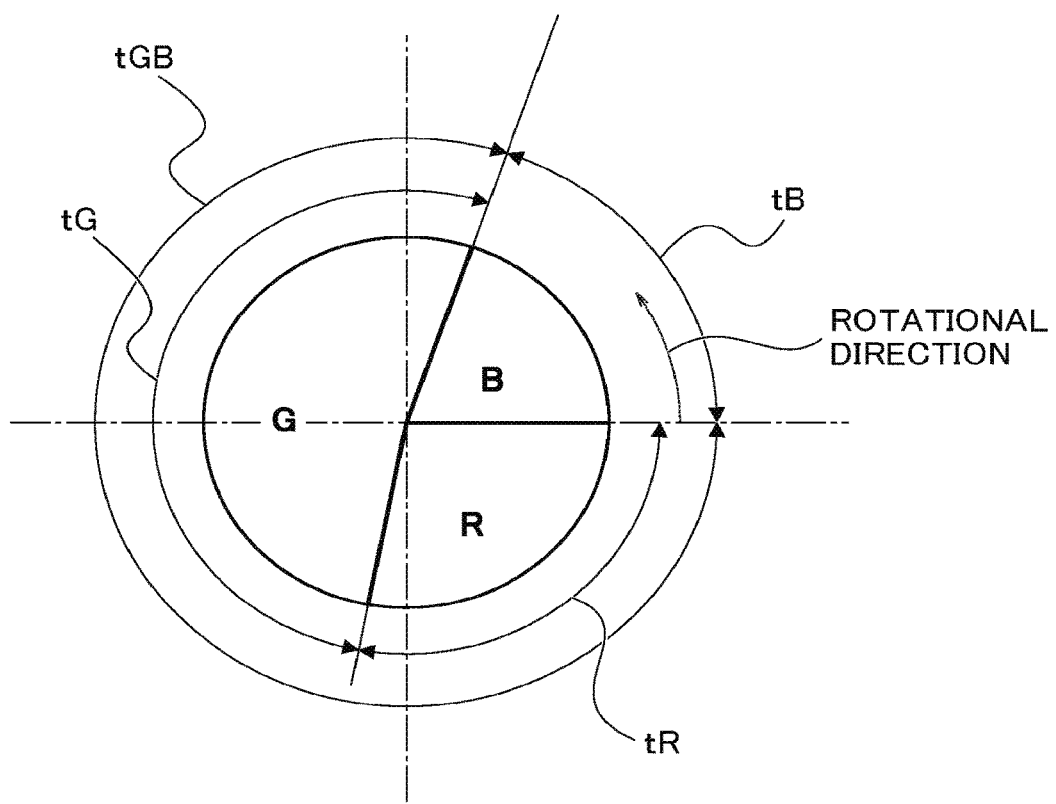
FIG. 7 is an explanatory view illustrating an example of a ratio of irradiation time of the blue light, the green light, and the red light which are irradiated to an image-forming element by the light path-switching disk shown in FIG. 5 and the color-changing disk shown in FIG. 6.

The relationship between the timing between the light path-switching disk 3 and the color-changing disk 10 is described in detail with reference to FIGS. 5-7.

The light path-switching disk 3 and the color-changing disk 10 rotate in synchronization at the same rotational speed. As shown in FIG. 5, an angle $\varphi B$ of the transmitting area 3b is determined to maintain the time tB (see FIG. 7) corresponding to the transmitting area 3b which transmits the laser beam BP having a blue component. An angle $\varphi GB$ of the reflecting area 3a has the remaining angle $(360-\varphi B)$.

While the blue laser beam BP passes through the transmitting area 3b of the light path-switching disk 3, the laser beam BP does not irradiate the phosphor 5, therefore, the phosphor 5 does not emit fluorescence.

While the blue laser beam BP is reflected by the reflecting area 3a, the laser beam BP irradiates the phosphor 5 and the phosphor 5 generates fluorescence.

The time tGB in which the laser beam irradiates the phosphor 5 corresponds to the angle $\varphi GB$ of the reflecting area 3a. Herein, as shown in FIG. 6, one of boundary lines q1 and q2 is determined to locate in the transmitting area 3b of the light path-switching member. The boundary lines q1 and q2 are the borderlines between the reflecting area 10a which reflects the green fluorescence GP and the reflecting area 10b which reflects the red fluorescence RP.

Next, the other borderline of boundary lines q1 and q2 is determined to locate in the place where it is capable of having the ratio of a time tG and tR which is required for irradiating the fluorescence GP and fluorescence RP. When the boundary lines q1 and q2 are determined as described above, a wide setting range can be obtained for the position of the boundary q1 upon designing. Therefore, even if the angles of the reflecting areas 10a and 10b of the color-changing disk 10 are not determined accurately, the necessary time for generating the blue light B, green light G, and red light R can be obtained by regulating the rotation timing of the light path-switching disk 3 when assembling the projector, as shown in FIG. 7.

In Embodiment 1, the light path-switching disk 3 is configured to rotate to change the light path periodically, and also the color-changing disk 10 is configured to rotate to change colors periodically. However, it is not limited to the above. For example, the light path-switching disk 3 and the color-changing disk 10 can be configured to reciprocate periodically.

Modified Example of Embodiment 1

Figure 8:
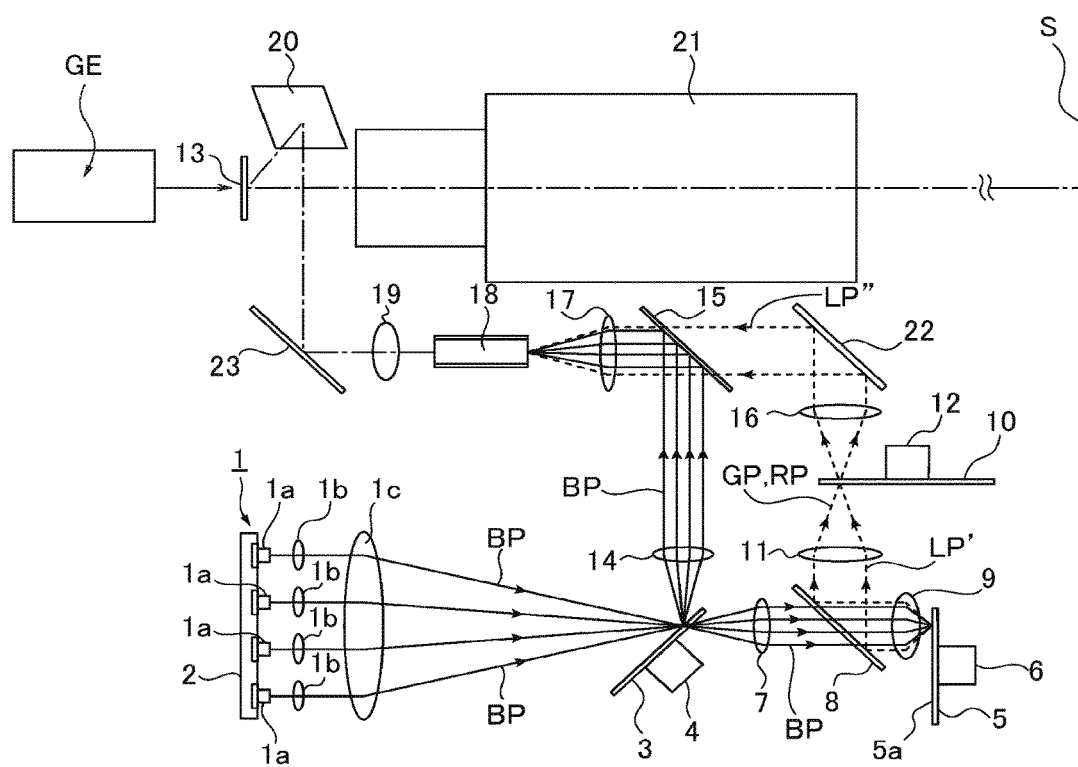
FIG. 8 is an optical view showing a modified example of an optical system of the projector according to Embodiment 1 of the present invention.

FIG. 8 illustrates a modified example of the optical system according to Embodiment 1. The phosphor 5 is disposed in the transmitting light path in which the blue laser light BP which has transmitted through the transmitting area 3b of the light path-switching disk 3 travels. Also, a dichroic mirror 15 is disposed in the reflecting light path in which the blue laser beam BP which is reflected by the reflecting area 3a of the light path-switching disk 3 travels. In other words, a light path in which the light emitted from the light source section 1 travels towards the image-forming element through the light-condensing lens 14 and the dichroic mirror 15 is disposed. And also, a light path in which the fluorescence excited by the color light emitted from the light source section 1 travels towards the color-changing disk 10 through the light-condensing lens 9, dichroic mirror 8 and light-condensing lens 11 is disposed.

Figure 9:
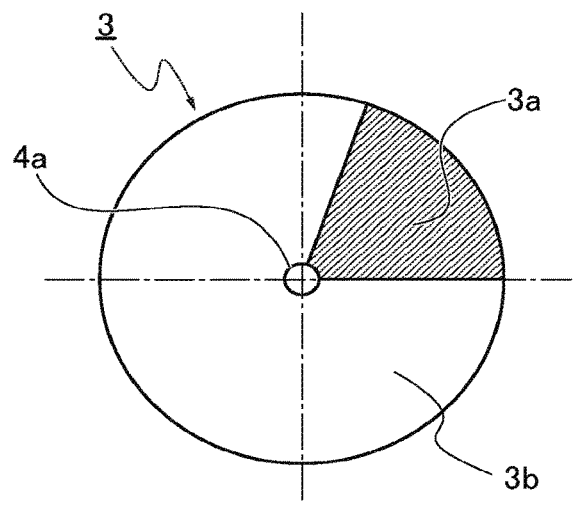
FIG. 9 is a plan view of a light path-switching disk of the projector shown in FIG. 8.
Figure 10:
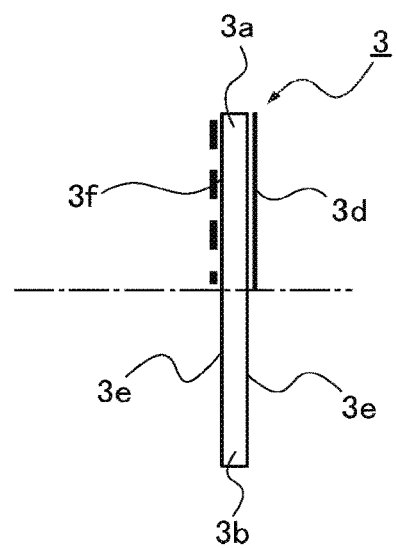
FIG. 10 is a side surface view of the light path-switching disk shown in FIG. 9.
Figure 11:
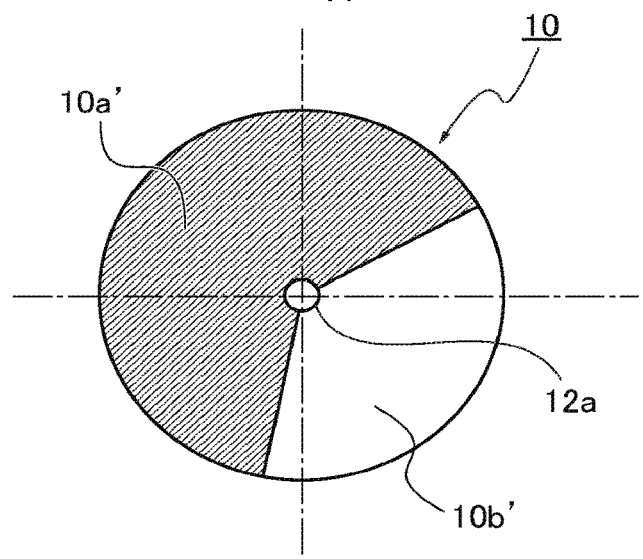
FIG. 11 is a plan view of a color-changing disk of the projector shown in FIG. 8.

In the modified example, as shown in FIG. 9, the angle of the reflecting area 3a is similar to the angle of the transmitting area 3b shown in FIG. 2. The angle of the transmitting area 3b is similar to the angle of the reflecting area 3a shown in FIG. 2. As shown in FIG. 10, a reflection-preventing coat 3e is formed on both surfaces of the transmitting area 3b of the light path-switching disk 3.

As shown in FIG. 10, a dispersing surface 3f is formed in the reflecting area 3a on the surface on which the laser beam BP irradiates and a reflection-preventing coat 3d is formed on the opposite surface.

Herein, the color-changing disk 10 includes a transmitting area 10a' which transmits the green fluorescence GP and blocks the transmission of the red fluorescence RP, and a transmitting area 10b' which transmits the red fluorescence RP and blocks the transmission of the green fluorescence GP.

The angle of the transmitting area 10a' is similar to the angle of the reflecting area 10a shown in FIG. 4, and the angle of the transmitting area 10b' is similar to the angle of the reflecting area 10b shown in FIG. 4. The color-changing disk 10 is disposed in the direction which is perpendicular to the light path of the light-condensing lenses 11 and 16. A reflecting mirror 22 for turning the light path is disposed between the light-condensing lens 16 and the dichroic mirror 15. A reflecting mirror 23 for turning the light path is disposed between the light-condensing lens 19 and the reflecting mirror 20.

The function of the optical system of the projector shown in FIG. 8 is similar to the function of the optical system of the projector as shown in FIG. 1, so the description of the function is omitted herein. As described above, according to the present invention, the phosphor 5 can be disposed on each of the transmitting light path and the reflecting light path of the laser beam BP in the light path-switching disk 3. Thereby, it is possible to have more choice in the layout of each of the optical elements.

Embodiment 2

Figure 12:
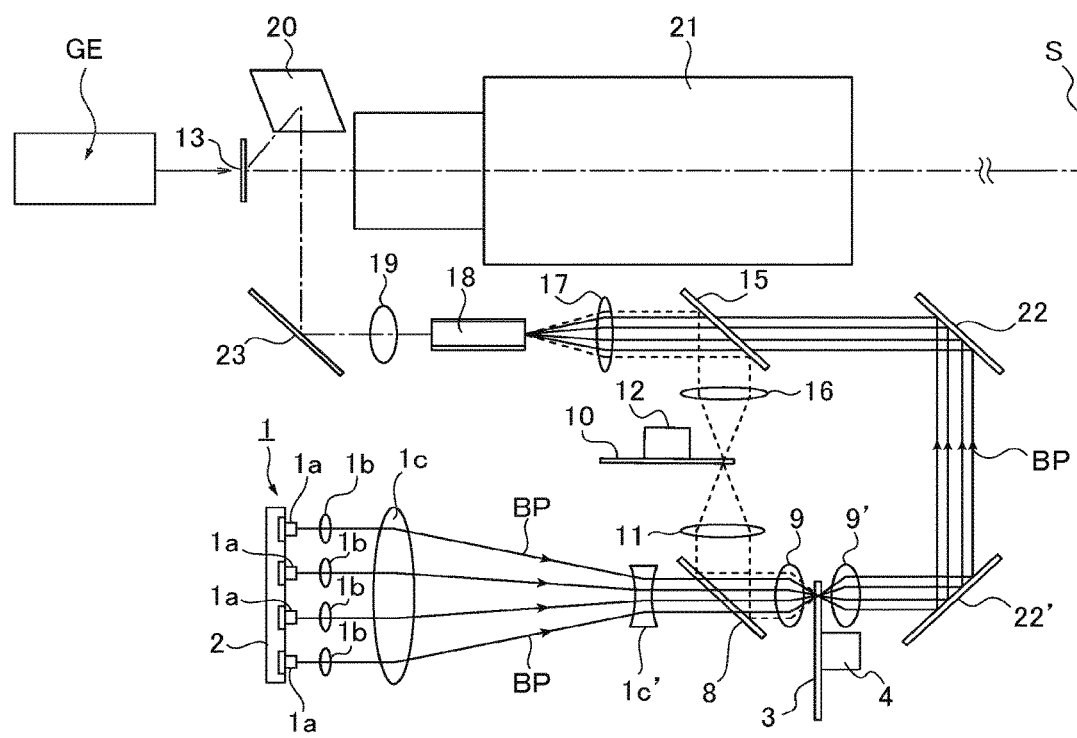
FIG. 12 is an optical view illustrating a main configuration of an optical system of a projector according to Embodiment 2.

FIG. 12 is an optical view illustrating an optical system of a projector according to Embodiment 2 of the present invention. Herein, a dichroic mirror which transmits the blue laser beam BP and guides it to the light path-switching disk 3, and reflects the light of another color than blue and guides it to the color-changing disk 10 is disposed between the light path-switching disk 3 and the condensing lens 1c.

Figure 13:
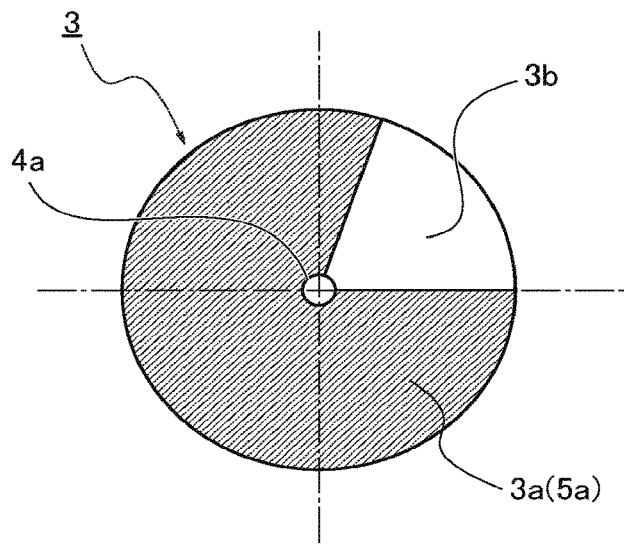
FIG. 13 is a plan view of a light path-switching disk of the projector shown in FIG. 12.
Figure 14:
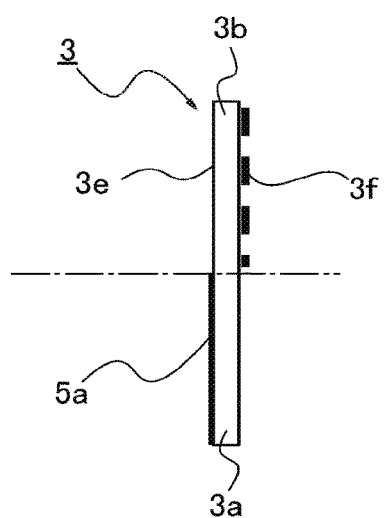
FIG. 14 is a side surface view of the light path-switching disk shown in FIG. 13.

A concave lens 1c' which converts the laser beam BP into the parallel light flux is disposed between the light-condensing lens 1c and the dichroic mirror 8. The light path-switching disk 3 includes a reflecting area 3a on which the fluorescent coat 5a is applied and a transmitting area 3b on which a fluorescent coat is not applied as illustrated in FIGS. 13, 14.

Similar to Embodiment 1, a reflection-preventing coat 3e is formed in the transmitting area 3b on the surface in which the laser beam BP irradiates. A light-condensing lens 9 is disposed between the dichroic mirror 8 and the light path-switching disk 3.

The light-condensing lens 9 concentrates the parallel light flux of the laser beam BP on the light path-switching disk 3 in a spot form and concentrates the fluorescence generated through the reflecting area 3a of the light path-switching disk 3 and converts it into a parallel light flux.

The laser beam BP which has transmitted through the transmitting area 3b of the light path-switching disk 3 becomes a parallel light flux through the light-condensing lens 9' and is guided to the dichroic mirror 15 through the reflecting mirrors for light-path turning 22' and 22.

The fluorescence RP including the green fluorescence GP and red fluorescence RP which is generated through the reflecting area 3a of the light path-switching disk 3 is guided to the color-changing disk 10 through the dichroic mirror 8.

Figure 15:
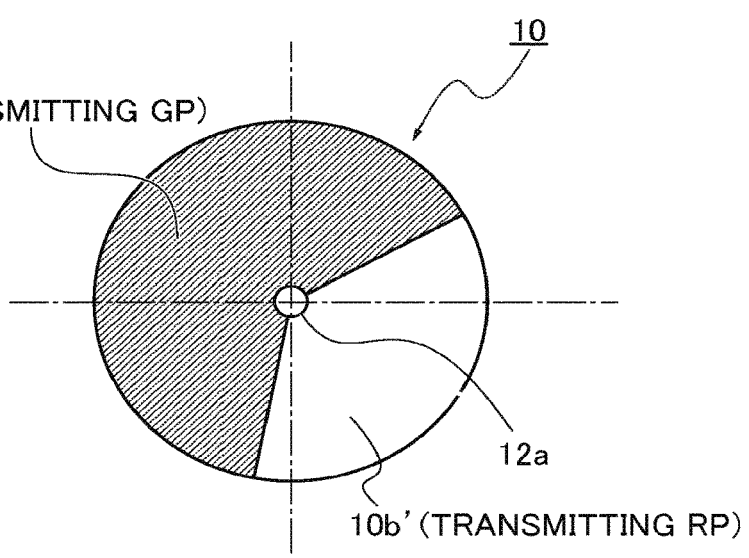
FIG. 15 is a plan view of a color-changing disk of the projector shown in FIG. 12.

The color-changing disk 10 is, as shown in FIG. 15, configured of a rotatable disk for changing the color component in turn. The rotatable disk includes a transmitting area 10a' and a transmitting area 101D' which are divided with an angle to the rotational direction. The transmitting area 10a' transmits the green fluorescence GP and absorbs or reflects the red fluorescence RP and the transmitting area 10b' transmits the red fluorescence RP and absorbs or reflects the green fluorescence GP.

The light-condensing lenses 11 and 16 are disposed between the dichroic mirror 8 and dichroic mirror 15. The color-changing disk 10 is disposed between the light-condensing lenses 11 and 16, and rotates on the plan perpendicular to the optical axis of the light-condensing lenses 11 and 16.

According to Embodiment 2, a light path in which the color light emitted from the light source section 1 passes towards the image-forming element through the light-condensing lens 9', reflecting mirror 22', reflecting mirror 22, dichroic mirror 15, and the light-condensing lens 17' is formed.

The light path in which the fluorescence excited by the light having color emitted from the light source section 1 passes towards the color-changing disk 10 through the light-condensing lens 9, dichroic mirror 8, and light-condensing lens 11 is formed.

According to Embodiment 2, the phosphor 5 and the light path-switching disk 3 can be configured integrally so that the number of the driving sources as the driving element for rotation can be lowered, compared with Embodiment 1 and the modified example of Embodiment 1. Therefore, the optical element of the optical system can be simplified.

Figure 16A:
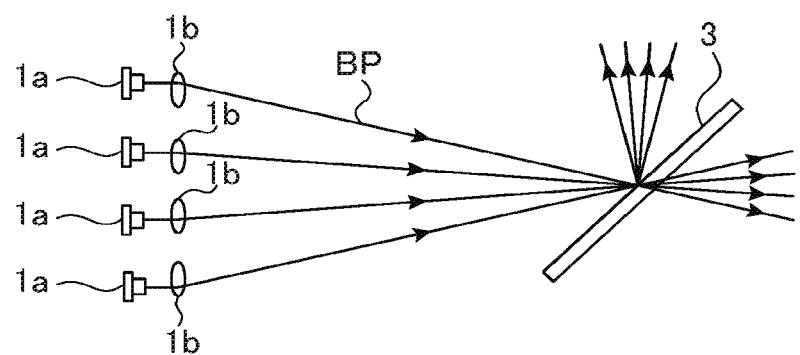
FIGS. 16A-16B are optical views illustrating another example of a light source section in which laser beams emitted from the light source section of the projector shown in FIGS. 1, 8 and 12 are concentrated.

In Embodiments 1 and 2, the light-condensing lens 1c is disposed in the light source section 1 and the laser beam BP is concentrated on the light path-switching disk 3. However, the configurations are not always limited to the above. For example, as shown in FIG. 16A, it can be configured such that the incident position of the laser beam BP which enters the coupling lens 1b is provided at the eccentric position from the center of the optical axis of the coupling lens and concentrates the light on the light path-switching disk 3 without providing the condensing lens 1c in the light source 1.

Figure 16B:
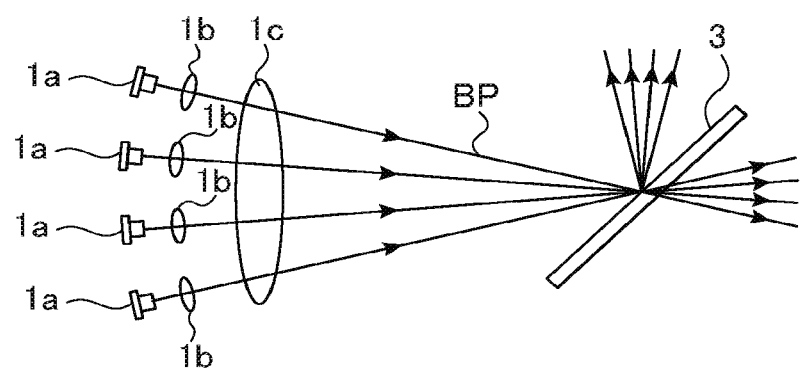

In addition, as shown in FIG. 16B, the laser diode 1a and the coupling lens 1b can be disposed in a concentrating fashion so that the light is concentrated on the light path-switching disk 3. Various configurations can be applied for such an optical system which concentrates the light by using the laser diode 1a, coupling lens 1b and light-condensing lens 1c.

Moreover, the relationship between the transmission and reflection of the dichroic mirrors 8 and 15 can be determined freely according to the configurations of the optical system as long as it does not exceed the range of the purport of the present invention.

As described in above Embodiments 1 and 2, the light source section 1 can be configured in only one variation so that the cooling configuration of the light source section 1 can be simplified.

In addition, the phosphor 5 is also configured in one variation and it is unnecessary to divide a fluorescence area of the phosphor 5 in more than two variations. Thereby the phosphor 5 can be made simply. Consequently, it is possible to have more choice for the layout of each of the optical elements and to minimize the projector.

Embodiment 3

Figure 17:
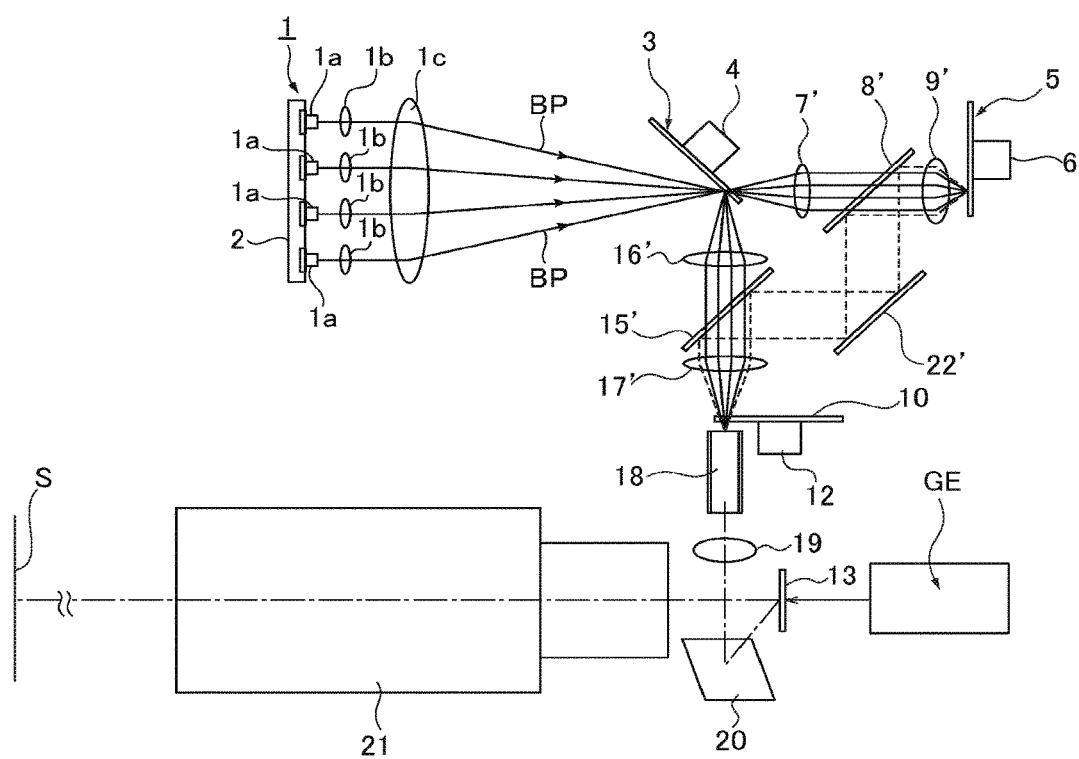
FIG. 17 is an optical view illustrating a main configuration of an optical system of a projector according to Embodiment 3 of the present invention.

FIG. 17 is an optical view which illustrates schematically the configuration of the optical system of a projector having a light source device according to Embodiment 3 of the present invention.

In FIG. 17, the same numerals and symbols are indicated for elements having similar configurations to Embodiment 1.

A light source section 1 is configured of a laser diode 1a (LD), a coupling lens 1b, and a light-condensing lens 1c.

A plurality of laser diodes 1a is disposed on a driving circuit board 2 and the coupling lens 1b is disposed on each laser diode 1a.

A laser beam emitted from the laser diode 1a is concentrated through the coupling lens 1b and guided to the light-condensing lens 1c as a parallel light flux. The laser diode 1a emits blue laser beam BP.

In the light path in which the blue laser beam BP emitted from the light source section 1 passes, a light path-switching disk 3 which regularly switches the light path through which the color light is emitted from the light source section 1 passes is formed. The light path is switched between the light path where fluorescence excited by the blue light emitted from the light source section 1 passes and the light path where the blue light emitted from the light source section 1 passes towards an image-forming panel 13 as an image-forming element.

Figure 18:
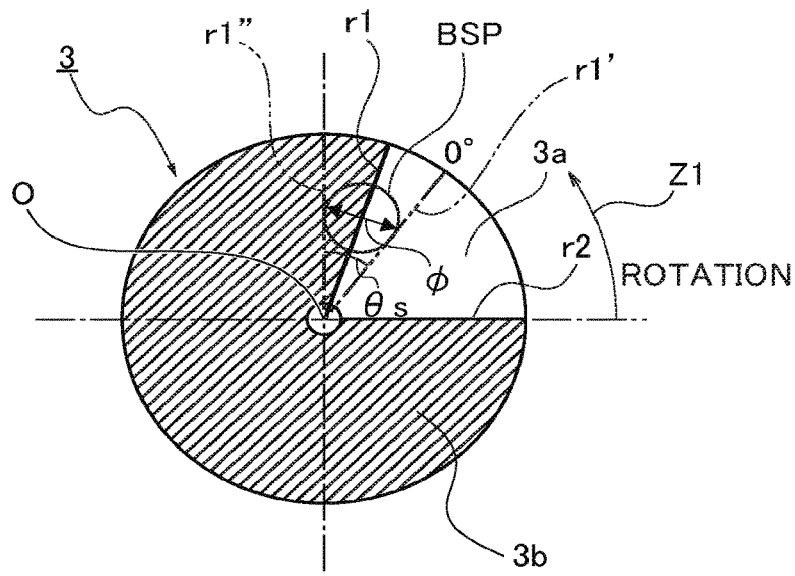
FIG. 18 is an explanatory view which schematically illustrates a relationship between a light path-switching disk and a beam spot on the disk according to Embodiment 3 of the present invention.

As shown in FIG. 18, a beam spot BSP is formed by the irradiation of the laser beam BP on the light path-switching disk 3. The light path-switching disk 3 is configured of a rotatable disk for switching the light path in turn. The rotatable disk includes a reflecting area 3a and a transmitting area 3b, which are divided in the rotational direction.

The light path-switching disk 3 is disposed at an angle to the optical axis of the light-condensing lens 1c. The light path-switching disk 3 is driven to rotate by the stepping motor 4.

In the light path through which the blue laser diode BP reflected by the reflection area 3a of the light path-switching disk passes, the blue laser beam BP emitted from the light source section 1 passes towards a light tunnel 18.

In the light path through which the blue laser beam BP has transmitted through the transmission area 3b of the light path-switching disk 3, the blue laser beam BP irradiates the phosphor 5.

In the light path in which the blue laser beam BP emitted from the light source section 1 is guided to the light tunnel 18, a light-condensing lens 16', dichroic mirror 15' for light-path combining, and light-condensing lens 17' are disposed.

A color-changing disk 10 is disposed between the light tunnel 18 and the light-condensing lens 17'. The color-changing disk 10 is equally divided into four segments.

The dichroic mirror 15' transmits the blue laser beam BP and reflects fluorescence RP and GP generated through the phosphor 5. A light path in which the color laser beam BP emitted from the light source section 1 passes towards the image formation element through the light-condensing lens 16', dichroic mirror 15', and light-condensing lens 17' is disposed.

The dichroic mirror 8' transmits the blue laser beam BP and reflects the fluorescence RP and GP. The fluorescence RP and GP which is reflected by the dichroic mirror 8' is reflected by the reflecting mirror 22' and guided to the dichroic mirror 15'.

In Embodiment 3, in the light path formed through the light-condensing lens 9', dichroic mirror 8', reflecting mirror 22', dichroic mirror 15', and light-condensing lens 17', the fluorescence RP and GP excited by the color light emitted from the light source section 1 passes towards the color-changing disk 10.

Figure 19:
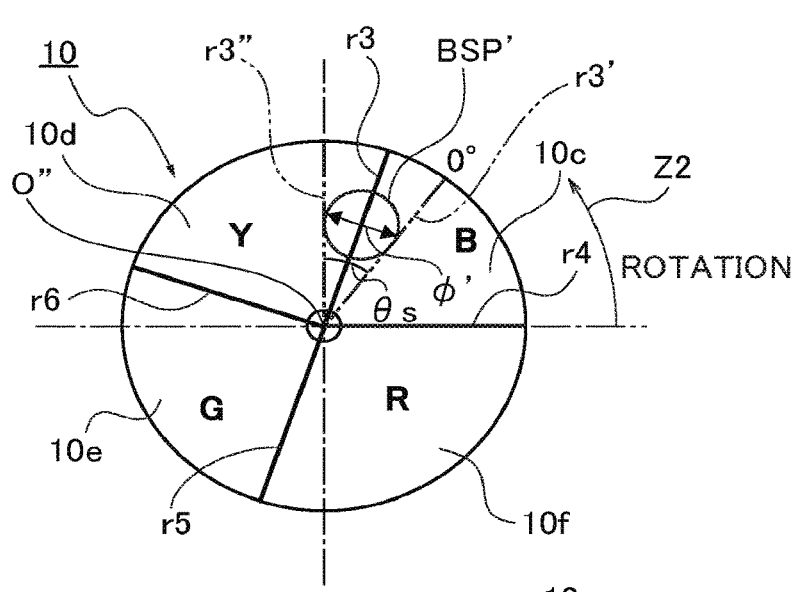
FIG. 19 is an explanatory view which schematically illustrates a relationship between a color-changing disk and a beam spot on the disk according to Embodiment 3 of the present invention.

The color-changing disk 10, as shown in FIG. 19, includes a transmitting area 10c, a transmitting area 10d, and a transmitting area 10e. The transmitting area 10c transmits the laser beam BP and blocks transmission of both of fluorescence GP and RP, the transmitting area 10d transmits yellow fluorescence YP (both of fluorescence GP and RP) and blocks transmission of the laser beam BP, the transmitting area 10e transmits the fluorescence GP and blocks transmission of the laser beam BP and the fluorescence RP, and the transmitting area 10f transmits the fluorescence RP and blocks transmission of the laser beam BP and fluorescence GP.

The transmitting areas 10c to 10f are configured from an arc-like area. The angle of the arc to the center O" of the arc-like area 10c is, for example, 75 degrees. In addition, the arc-like areas 10d to 10f are formed to have equal angles. The angle thereof to the center O" is, for example, 95 degrees.

The laser beam BP is reflected when the reflecting area 3a of the light path-switching disk 3 crosses through the light path of the laser beam BP, and is guided to the transmitting area 10c of the color-changing disk 10 through the light-condensing lens 16', dichroic mirror 15', and light-condensing lens 17'.

The laser beam BP is transmitted when the transmitting area 3b of the light path-switching disk 3 crosses the light path of the laser beam BP and is guided to the phosphor 5 through the light-condensing lens 7', dichroic mirror 8', and light-condensing lens 9'.

The phosphor 5 is excited by the laser beam BP and generates the fluorescence RP and GP. The laser beam BP and fluorescence RP and GP are guided to the dichroic mirror 8' and the fluorescence RP and GP is reflected by the dichroic mirror 8'. The reflected fluorescence RP and GP is further reflected by the reflecting mirror 22' and guided to the dichroic mirror 15'.

The light paths of the laser beam BP and fluorescence RP and GP are concentrated through the dichroic mirror 15'. The fluorescence RP and GP are guided to the transmitting areas 10d, 10e and 10f of the color-changing disk 10 through the light-condensing lens 17'.

Each color light which has transmitted through each transmitting area 10c to 10f of the color-changing disk 10 is incident on the light tunnel 18.

The distribution of the light amount of each color light is averaged during traveling in the light tunnel 18. Each color light emitted from the light tunnel 18 becomes a parallel light flux by the light-condensing lens 19. The light is reflected by the reflecting mirror 22 and guided to the image-forming panel 13.

The image-forming panel 13 is controlled by the image generation part GE. Each color light is reflected by the image-forming panel 13 and irradiated to a screen S through the projector lens 21. Thereby, as shown in FIG. 19, each color light having a B, R, G, Y component is formed while the color-changing disk 10 rotates one revolution and the color image is enlarged and displayed on the screen S.

In Embodiment 3, the color-changing disk 10 is disposed between the light tunnel 18 and the light-condensing lens 17' so that the light-condensing lens 17' can be used together with the light-condensing lens 11 for the color-changing disk.

Namely, the light-condensing lens 17 originally provided in the optical system shown in FIG. 1 and the optical system shown in FIG. 8 is also used for the condensing lens 11. Thereby the simplification of the optical system can be achieved.

(Modified Embodiment of Color-Changing Disk)

In FIG. 19, the color-changing disk 10 is configured of the four segments of the transmitting areas 10c to 10f However, the color-changing disk 10 is basically disposed in order to generate fluorescence RP and GP from the fluorescence YP.

The fluorescence YP and the laser beam BP can be switched by the light path-switching disk 3. Accordingly, it is not necessary to switch the fluorescence YP and the laser beam BP by the color-changing disk 10.

Furthermore, if the fluorescence YP and the laser beam BP are generated separately to each other, the fluorescence GP and RP exists between the fluorescence YP and laser beam GP by the color-changing disk 10. Therefore, the number of segments of the color-changing disk 10 becomes four.

However, if the blue light B generated from laser beam BP and yellow light Y generated from the fluorescence YP are generated adjacently to each other, the number of segments of the color-changing disk 10 can be reduced from 4 segments to 3 segments. Thereby, the number of manufacturing processes of the color-changing disk 10 can be reduced and cost reduction can be achieved.

Figure 20:
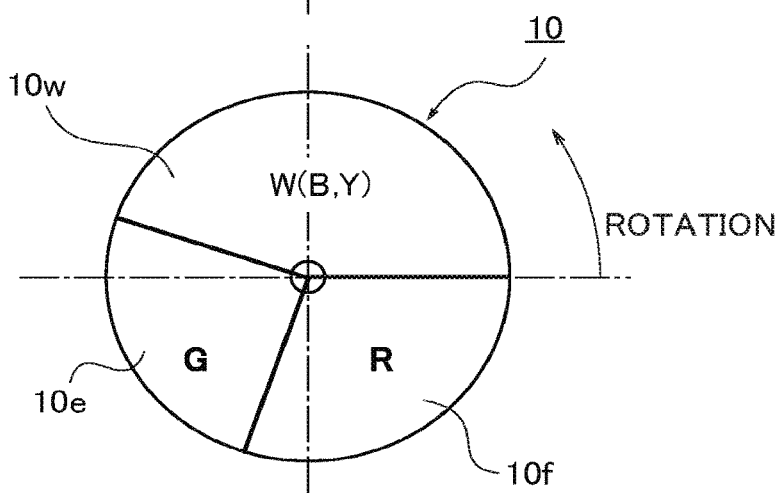
FIG. 20 is an explanatory view illustrating another example of the color-changing disk.

FIG. 20 illustrates an example of the three-segment color-changing disk 10. Herein, as shown in FIG. 20, the color-changing disk 10 includes an arc-like area 10W configured of a cutout or a transparent area, an arc-like area 10e which transmits the fluorescence GP and blocks transmission of the laser beam BP and fluorescence RP, and an arc-like area 10f which transmits fluorescence RP and blocks transmission of the laser beam BP and fluorescence GP.

With the use of the color-changing disk 10 shown in FIG. 20, as described above, the laser beam BP and fluorescence YP can be switched by the light path-switching disk 3 solely.

(Control for Preventing Color Mixing by Image Generation Part GE)

As shown in FIGS. 18 and 19, the beam spots BSP and BSP' are formed on the light path-switching disk 3 and the color-changing disk 10. The beam spots BSP and BSP' have a predetermined size.

As shown in FIG. 18, the beam spot BSP straddles both of the reflecting area 3a and transmitting area 3b near the boundaries r1 and r2 which are between the reflecting area 3a and the transmitting area 3b of the light path-switching disk.

In addition, as shown in FIG. 19, the beam spot BSP' straddles the transmitting areas which are disposed adjacently to each other near the boundaries r3 to r6 between the transmitting areas 10c to 10f of the color-changing disk 10.

Figure 21:
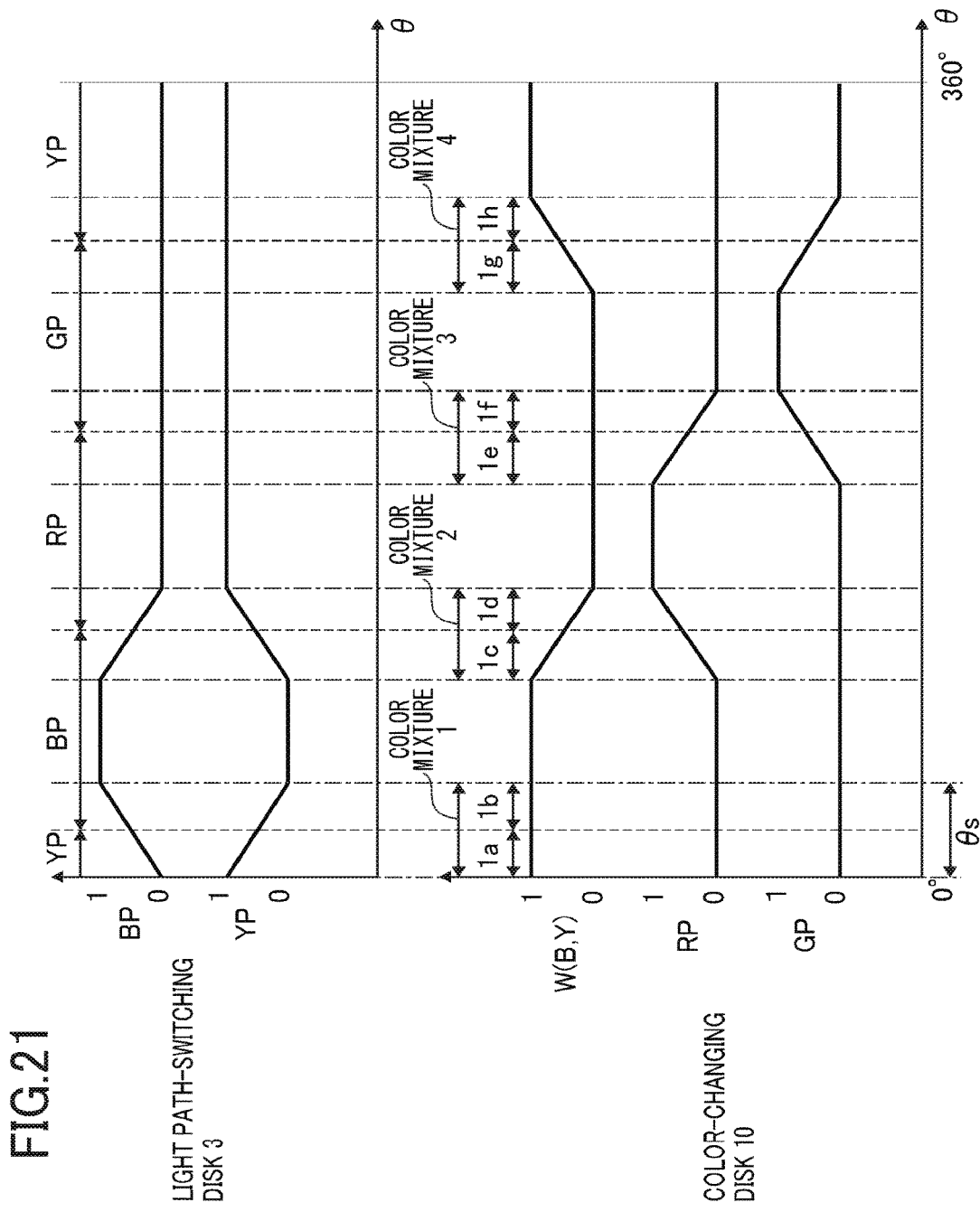
FIG. 21 is a timing chart which schematically illustrates a mixture of color occurring in the case where the beam spot on the light path-switching disk and the color-changing disk according to Embodiment 3 of the present invention crosses boundary areas of the disks.

On the boundaries r1 to r6 on which the beam spots BSP and BSP' straddle, the light of each different color are incident on the light tunnel 18 at the same time, therefore, mixing of colors occurs. FIG. 21 is a timing chart which schematically illustrates the relationship between the color mixture, the light path-switching disk 3, and the color-changing disk 10.

The duration of the color mixing is decided according to the diameters of the BSP and BSP' provided that the rotation numbers of the light path-switching disk 3 and the color-changing disk 10 conform to each other and the rotation numbers per one unit of time remain constant.

(Description of Color Mixture Caused by Light Path-Switching Disk 3)

An angle which is formed by two tangential lines to the radial direction r1' and r1" is θs. The two tangential lines r1' and r1" pass through the rotation center O of the light path-switching disk 3 and have contact with the circle of the beam spot BSP. In addition, the rotation angle θ of the light path-switching disk 3 is 0 degrees when the boundary r1 conforms to the tangential line in the radial direction r1'.

In the above circumstances, when the light path-switching disk 3 rotates in the direction indicated with the arrow Z1, as shown in FIG. 21, the mixing of the fluorescence YP and laser beam BP starts. As the rotation angle θ of the light path-switching disk 3 becomes larger, the light amount of the fluorescence YP decreases and the light amount of the laser beam BP increases.

When the light path-switching disk 3 further rotates in the same direction, the rotation angle θ of the light path-switching disk 3 becomes the same angle as θs, the boundary r1 becomes identical to the tangential line in the radial direction r1", and the light amount of fluorescence YP which is guided to the color-changing disk 10 becomes zero. The light amount of the laser beam BP which is guided to the color-changing disk 10 becomes stable as 1. Color mixing occurs while the boundary r1 crosses the beam spot BSP. For convenient description, the above mixture is represented as mixture 1.

Furthermore, while the light path-switching disk 3 rotates and the boundary r2 corresponds to the tangential line r1', the beam spot BSP is incident on only the reflecting area 3a of the light path-switching disk 3. Therefore, the light amount of the laser beam BP which is guided to the color-changing disk 10 remains stable as 1.

When the light path-switching disk 3 further rotates and the boundary r2 corresponds to the tangential line in the radial direction r1', a part of the beam spot BSP starts being incident on the transmitting area 3b of the light path-switching disk 3.

Thereby, the light amount of the laser beam BP which is guided to the color-changing disk 10 decreases and the light amount of fluorescence YP which is guided to the color-changing disk 10 increases. While the boundary r2 crosses the beam spot BSP, color mixing also occurs. Such a mixture is represented as mixture 2.

When the boundary r2 of the light path-switching disk 3 corresponds to the tangential line to the radial direction r1", the beam spot BSP is not incident on the reflecting area 3a of the light path-switching disk 3. Therefore, the light amount of the laser beam BP which is guided to the color-changing disk 10 becomes zero. On the other hand, the light amount of the fluorescence YP which is guided to the color-changing disk 10 becomes stable as 1. During the rotation of one revolution of the light path-switching disk 3, the above-described color mixtures 1 and 2 occur.

[Description of Color Mixture Caused by Color-Changing Disk 10]

For convenience, the spot diameter of the beam spot BSP' of the laser beam BP which is incident on the color-changing disk 10 is represented as φ'=φ. That is, the angle formed by the tangential lines in the radial direction r3' and r3" having contact with the beam spot BSP' is represented as θs.

The light path-switching disk 3 and the color-changing disk 10 rotate in synchronization in a state such that the rotational phases of the boundary r1 (boundary r2) and boundary r3 are conformable. In other words, the boundary r3 of the areas in the color-changing disk 10 and the boundary r1 of the areas in the light path-changing disk 3 correspond one by one and rotate to synchronize their own phases.

Herein, when the boundary r3 corresponds to the tangential line in the radial direction r3', the angle θ=0 degrees. When the color-changing disk 10 rotates in the direction indicated with the arrow Z2, the fluorescence YP and laser beam BP start mixing and the color mixture 1 continues while the angle θ of the color-changing disk 10 is between 0 to θs.

That is, during the latter half of the projecting time of the fluorescence YP by the color-changing disk 10, the color mixture 1a occurs because the laser beam BP is merged to the fluorescence YP. During the first half of the projecting time of the fluorescence YP by the color-changing disk, the color mixture 1b occurs because the fluorescence YP is merged to the laser beam BP.

Furthermore, while the color-changing disk 10 rotates in the direction indicated with the arrow Z2 and the boundary r4 corresponds to the tangential line in the radius direction r3', only the laser beam BP is guided to the light tunnel 18. During the above term, because only the laser beam BP is guided to the light tunnel 18, color mixing by the color-changing disk 10 does not occur.

Furthermore, during the term from which the color-changing disk 10 rotates and the boundary r4 corresponds to the tangential line in the radial direction r3' to which the boundary r4 corresponds to the tangential line in the radial direction r3", the color mixture 2 by the light path-switching disk 3 continues.

That is, during the latter half of the projecting time of the laser beam BP by the color-changing disk 10, the color mixture 1c occurs because the fluorescence RP is merged to the laser beam BP. During the first half of the projecting time of the fluorescence RP by the color-changing disk 10, a color mixture 1d occurs because the laser beam BP is merged to the fluorescence RP.

During the term from which the color-changing disk 10 further rotates and the boundary r4 corresponds to the tangential line in the radial direction r3" to which the boundary 5 corresponds to the tangential line in the radial direction r3', color mixing does not occur because the laser beam BP irradiates only the transmitting area 10f of the color-changing disk 10, and only the fluorescence RP is guided to the light tunnel 18.

During the term from which the color-changing disk 10 further rotates and the boundary r5 corresponds to the tangential line in the radial direction r3' to which the boundary 5 corresponds to the tangential line in the radial direction r3", color mixing of the fluorescence RP and fluorescence GP occurs. Such a mixture is represented as a color mixture 3.

That is, during the latter half of the projecting time of the fluorescence RP by the color-changing disk 10, the color mixture 1e occurs because the fluorescence GP is merged to the fluorescence RP. During the first half of the projecting time of the fluorescence GP of the color-changing disk 10, color mixing if occurs because the fluorescence RP is merged to the fluorescence GP.

During the term from which the color-changing disk 10 further rotates and the boundary r6 corresponds to the tangential line in the radial direction r3" to which the boundary r6 corresponds to the tangential line in the radial direction r3", only the fluorescence GP irradiates the transmitting area 10e of the color-changing disk 10, so only the fluorescence GP is guided to the light tunnel 18 and color mixing does not occur.

Furthermore, during the term from which the color-changing disk 10 rotates and the boundary r6 corresponds to the tangential line in the radial direction r3' to which the boundary r6 contacts with the tangential line to the radial direction r3", the color mixture of the fluorescence GP and fluorescence YP occurs. Such a mixture is represented as a color mixture 4.

That is, during the latter half of the projecting time of the fluorescence GP by the color-changing disk 10, the color mixture 1g occurs because the fluorescence YP is merged to the fluorescence GP. During the first half of the projecting time of the fluorescence YP, the color mixture 1h occurs because the fluorescence GP is merged to the fluorescence YP.

During the term from which the color-changing disk 10 further rotates and the boundary r6 corresponds to the tangential line in the radial direction r3" to which the boundary r3 corresponds to the tangential line in the radial direction r3', color mixing does not occur because only the fluorescence YP is guided to the light tunnel 18.

If such color mixtures 1 to 4 occur, the purity in color is lowered and the range of color reproduction is narrowed. Therefore, it can be considered that the laser diode (LD) 1a or the image-forming panel 13 is turned off during the projecting time in which the color mixture 1 to 4 occurs.

However, if the laser diode (LD) 1a or the image-forming panel 13 is turned off during the projecting time in which the color mixtures 1 to 4 occur, the image becomes dark accordingly.

Therefore, in Embodiment 3, in order to prevent the image becoming dark at minimum and to keep the color-reproduction range, the efforts described later are made.

Regarding the illuminating efficiency to the screen S, the illuminating efficiency of the laser beam BP is at the maximum because it is emitted from the light source section 1.

The fluorescence YP is generated through the irradiation of the laser beam BP. The illuminating efficiency of the fluorescence YP is determined by the exciting efficiency of the phosphor 5 by the laser beam BP. Because there is a loss of light amount conversion in the phosphor 5, the illuminating efficiency of the fluorescence YP becomes lower than that of the laser beam BP.

The laser beam BP includes a loss of light amount which is generated upon passing through the dichroic mirror 15'. The fluorescence YP, RP and GP include a loss of light amount upon being reflected by the dichroic mirror 8', reflecting mirror 22', and dichroic mirror 8'.

Herein, the above loss of light amount is disregarded. However, even if such loss of light amount is disregarded, there is a loss of light amount which cannot be disregarded in the fluorescence RP and GP.

That is, essentially, the laser beam BP and fluorescence YP can be transmitted through the color-changing disk 10. To the contrary, the fluorescence RP and GP include a loss generated upon transmitting through the color-changing disk 10. Therefore, the illuminating efficiencies of the fluorescence RP and GP are much lower than that of the laser beam.

Herein, regarding the ratio of the light amounts of the fluorescence GP and fluorescence RP in the fluorescence Y, if the light amount of the fluorescence GP is higher than that of the fluorescence RP, the illuminating efficiency to the screen S becomes laser beam BP>fluorescence YP>fluorescence GP>fluorescence RP.

In this regard, because the light amount of the fluorescence RP is lower than those of the laser beam BP, fluorescence YP, and fluorescence GP, the effect of the decrease of color reproducibility which is derived from color mixing in the fluorescence RP is the largest.

Figure 22:
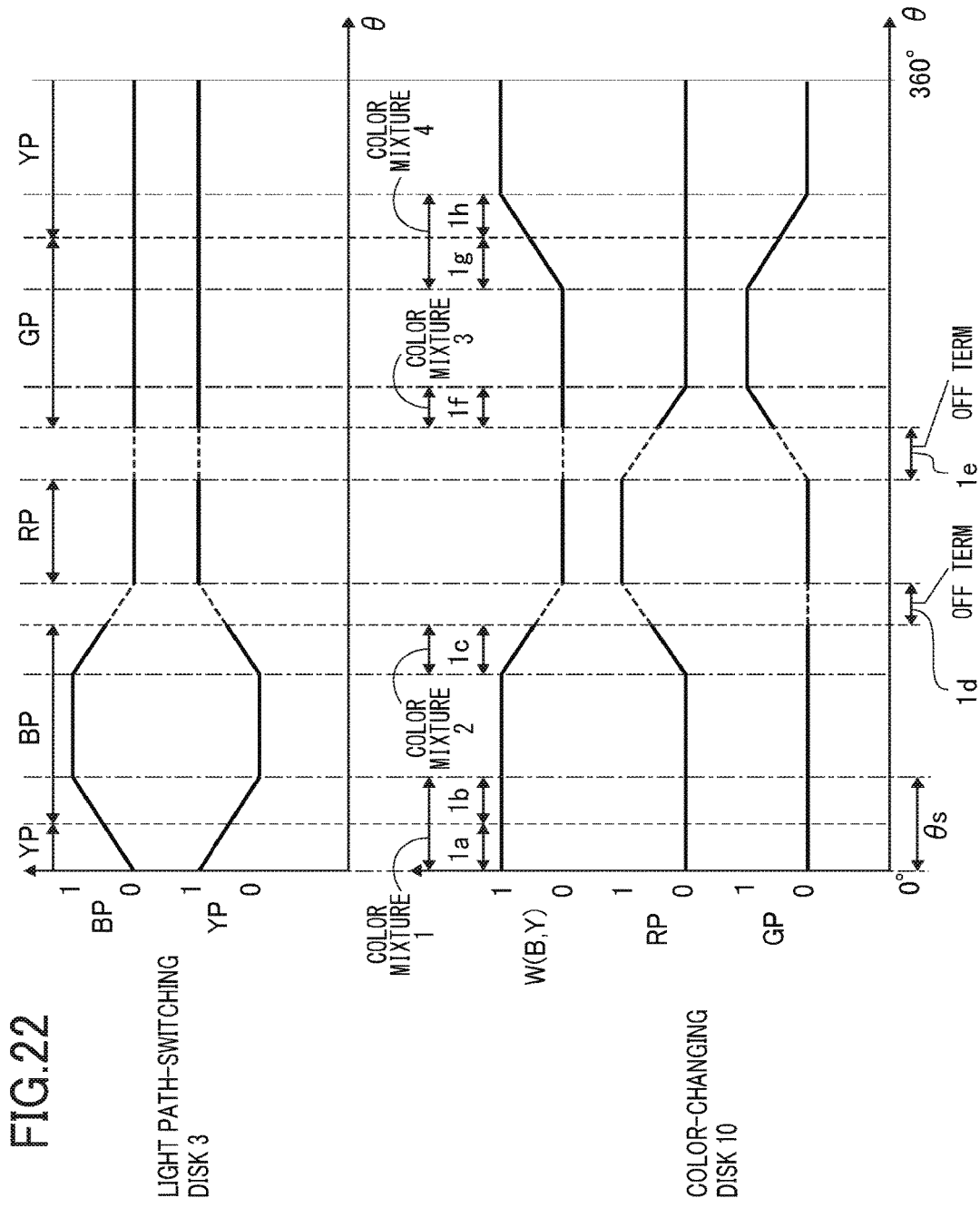
FIG. 22 is a timing chart which schematically illustrates an example to avoid the mixture of color generated in the case where the beam spot on the light path-switching disk and the color component disk according to Embodiment 3 of the present invention crosses the boundary areas of the disks.

Therefore, in Embodiment 3, as shown in FIG. 22 with the broken line, during the term in which the color mixture 1*d* and color mixture 1*e* occur, at least one of the laser diode 1*a* and the digital micromirror device DMD is turned off. Thereby, a bright projector can be achieved which can prevent the decrease of purity in color and the decrease of the color reproduction range.

Herein, the case in which the illuminating efficiency of the fluorescence RP is the lowest is described. When the illuminating efficiency of the fluorescence GP is the lowest, it is appropriate to configure such that at least one of the laser diode 1*a* and the digital micromirror device DMD is turned off during only the time in which the color mixture if and the color mixture 1*g* occur.

That is, as to the fluorescence or the laser beam BP which has the lowest illumination efficiency, it is appropriate to configure such that the laser diode 1*a* or the digital micromirror device DMD is turned off during the term in which color mixing occurs.

Additionally, it is also possible to configure the laser diode 1*a* or the digital micromirror device DMD to be turned off during the term in which color mixing upon projecting light having each different colors occurs.

In Embodiment 3, the phase of the boundary 1 of the light path-switching disk 3 and the phase of the boundary r3 of the color-changing disk 10 rotate in synchronization.

Thereby, the number of color mixtures can be reduced.

Also, it is possible for at least one of the laser diode 1*a* and the digital micromirror device to be turned off according to the larger diameter in the diameter Φ of the beam spot BSP of the light path-switching disk 3 and the diameter Φ' of the beam spot BSP' of the color-changing disk 10. Thereby, the control of on-off can be simplified.

Embodiment 4

In Embodiment 3, it is described that the phosphor coat 5*a* which generates green fluorescence GP which is different from the laser beam BP and yellow fluorescence YP including the red fluorescence RP is applied to the phosphor 5.

Figure 23:
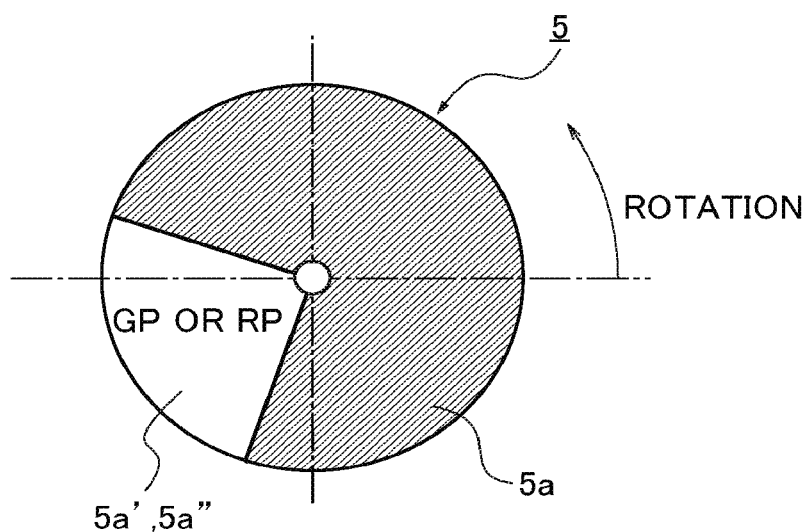
FIG. 23 is an explanatory view illustrating another example of a phosphor according to Embodiment 3.

However, as shown in FIG. 23, the phosphor coat 5*a*' which generates green fluorescence GP through the excitation of the laser beam BP or the phosphor coat 5*a*" which generates red fluorescence RP through the excitation of the laser beam BP can be applied on the phosphor 5.

From such a configuration, the fluorescent coats 5*a*' and 5*a*" can be applied during the term in which the green fluorescence GP is projected or the term in which the red fluorescence RP is projected.

Thereby, it is not necessary to pick up the green fluorescence GP or the red fluorescence RP from the phosphor coat 5*a* by the color-changing disk 10. The illuminating efficiency in green fluorescence GP or the red fluorescence RP can be increased.

Herein, in such circumstances, it is possible to cut light having a predetermined wavelength by the color-changing disk 10.

For example, when the phosphor coat 5*a*' which generates the green fluorescence GP is used, the color of the fluorescence GP can be controlled by cutting the fluorescence having a predetermined wavelength from the spectrum of the fluorescence GP.

In detail, the purity in green color can be increased by cutting the light having a long wavelength from the fluorescence GP.

According to the present invention, a color image can be generated by using a single light source section without separating the fluorescence area of the phosphor into an area generating green fluorescence and an area generating red fluorescence. Thereby, the manufacturing process of the phosphor can be simplified and furthermore, the configuration of the whole optical system can be simplified, and it is possible to have more choice in the layout of each of the optical elements.

Although the embodiments of the present invention have been described above, the present invention is not limited thereto. It should be appreciated that variations may be made in the embodiments described by persons skilled in the art without departing from the scope of the present invention.

The invention claimed is:

1. A light source device, comprising:
 a light source section that emits visible excitation light;
 a phosphor that emits fluorescent light by the excitation light emitted from the light source section; and
 a color-changing section that picks up color light having a color different from that of the fluorescent light from the fluorescent light emitted from the phosphor, wherein
 an emission timing of the fluorescent light in the phosphor is synchronized with a switching timing between the excitation light and the color light by the color-changing section, and
 the light source section decreases brightness of the light source section in the switching timing between the excitation light and the color light by the color-changing section.

2. A projector comprising:
 a light source device that emits light of plural colors; and
 an imaging forming element that forms an image through sequential irradiation of the light of the plural colors,
 the projector projecting an image formed on the image forming element, wherein
 the light source device includes:
  a light source section that emits visible excitation light;
  a phosphor that emits fluorescent light by the excitation light emitted from the light source section; and
  a color-changing section that picks up color light having a color different from that of the fluorescent light from the fluorescent light emitted from the phosphor,
  an emission timing of the fluorescent light in the phosphor is synchronized with a switching timing between the excitation light and the color light by the color-changing section, and
  at least one of the light source section and the image forming element decreases brightness of a projection image in the switching timing between the excitation light and the color light by the color-changing section.

* * * * *